United States Patent
Ambrose

(10) Patent No.: US 10,807,799 B2
(45) Date of Patent: *Oct. 20, 2020

(54) SYSTEM, METHOD, AND APPARATUS FOR PICKING-AND-PUTTING PRODUCT

(71) Applicant: Wynright Corporation, Elk Grove, IL (US)

(72) Inventor: Kevin H. Ambrose, Homer Glen, IL (US)

(73) Assignee: Wynright Corporation, Elk Grove, IL (US)

( * ) Notice: Subject to any disclaimer, the term of this patent is extended or adjusted under 35 U.S.C. 154(b) by 176 days.

This patent is subject to a terminal disclaimer.

(21) Appl. No.: 16/031,795

(22) Filed: Jul. 10, 2018

(65) Prior Publication Data

US 2019/0039827 A1    Feb. 7, 2019

Related U.S. Application Data

(63) Continuation of application No. 13/900,513, filed on May 22, 2013, now Pat. No. 10,017,323.

(Continued)

(51) Int. Cl.
*B65G 1/137*  (2006.01)
*G06Q 10/08*  (2012.01)

(52) U.S. Cl.
CPC .......... *B65G 1/137* (2013.01); *G06Q 10/087* (2013.01); *B65G 2209/04* (2013.01)

(58) Field of Classification Search
CPC ......... B65B 17/00; B65B 67/00; B65B 67/02; B65G 1/137; B65G 1/1373; B65G 1/1376;

(Continued)

(56) References Cited

U.S. PATENT DOCUMENTS

| 5,509,538 A | 4/1996 | Spindler et al. |
| 5,877,962 A | 3/1999 | Radcliffe |

(Continued)

FOREIGN PATENT DOCUMENTS

| DE | 3909139 | 9/1990 |
| DE | 202007011875 | 4/2008 |

(Continued)

OTHER PUBLICATIONS

International Searching Authority, International Search Report, dated Oct. 8, 2013.

(Continued)

*Primary Examiner* — Stephen F. Gerrity
(74) *Attorney, Agent, or Firm* — Scott T. Griggs; Griggs Bergen LLP

(57) ABSTRACT

A system, method, and apparatus for picking-an-putting product are disclosed. Within a logistics and product fulfillment environment, such as in a warehouse or distribution center environment, for example, a picking zone is established having picking bays arranged in framed rows with each picking bay having pick module associated therewith. Multiple cartons are indexed into a carton train and an operator is directed to pick-by-light and put-by-voice. More particularly, the operator is directed to a pick by the light display informing the operator which products to pick. Within each pick, a voice indication directs the operator to one or more puts by directing the operator to select a number of product and corresponding carton from the picking bay associated with the pick.

20 Claims, 10 Drawing Sheets

Related U.S. Application Data

(60) Provisional application No. 61/650,366, filed on May 22, 2012.

(58) Field of Classification Search
CPC ............ B65G 2209/02; B65G 2209/04; G06Q 10/087
USPC ... 53/396, 473–475, 52, 235, 249–251, 390; 700/216
See application file for complete search history.

(56) References Cited

U.S. PATENT DOCUMENTS

| | | |
|---|---|---|
| 6,622,127 B1 | 9/2003 | Klots et al. |
| 6,775,588 B1 | 8/2004 | Peck |
| 7,363,104 B2 | 4/2008 | Stevens |
| 7,516,848 B1 | 4/2009 | Shakes et al. |
| 7,722,307 B2 | 5/2010 | Bell |
| 7,881,820 B2 | 2/2011 | Antony et al. |
| 10,017,323 B2 | 7/2018 | Ambrose |
| 2002/0070846 A1 | 6/2002 | Bastian, II et al. |
| 2003/0233165 A1 | 12/2003 | Hein et al. |
| 2004/0128133 A1 | 7/2004 | Sacks et al. |
| 2004/0137831 A1 | 7/2004 | Kollodge et al. |
| 2004/0138781 A1 | 7/2004 | Sacks et al. |
| 2004/0153207 A1 | 8/2004 | Peck |
| 2004/0203409 A1 | 10/2004 | Swan |
| 2004/0207512 A1 | 10/2004 | Bastian, II |
| 2004/0247421 A1 | 12/2004 | Saunders et al. |
| 2005/0149226 A1 | 7/2005 | Stevens et al. |
| 2006/0136237 A1 | 6/2006 | Spiegel et al. |
| 2006/0206235 A1 | 9/2006 | Shakes et al. |
| 2008/0015733 A1 | 1/2008 | Robey |
| 2008/0183328 A1 | 7/2008 | Danelski |
| 2010/0033341 A1 | 2/2010 | Ishida et al. |
| 2012/0019399 A1 | 1/2012 | Vargo et al. |
| 2013/0253697 A1 | 9/2013 | Issing |
| 2014/0083058 A1 | 3/2014 | Issing et al. |

FOREIGN PATENT DOCUMENTS

| | | | |
|---|---|---|---|
| DE | 102007019455 | 11/2008 | |
| DE | 102008014110 | 10/2009 | |
| EP | 0300830 | 1/1989 | |
| EP | 1975091 | 10/2008 | |
| JP | H0733219 | 2/1995 | |
| JP | 08310620 A | * 11/1996 | ......... B65G 2209/04 |
| WO | 2006098943 | 9/2006 | |
| WO | 2012028371 | 3/2012 | |
| WO | 2013177341 | 11/2013 | |

OTHER PUBLICATIONS

Supplementary European Search Report, European Patent Office, dated Dec. 10, 2015.

* cited by examiner

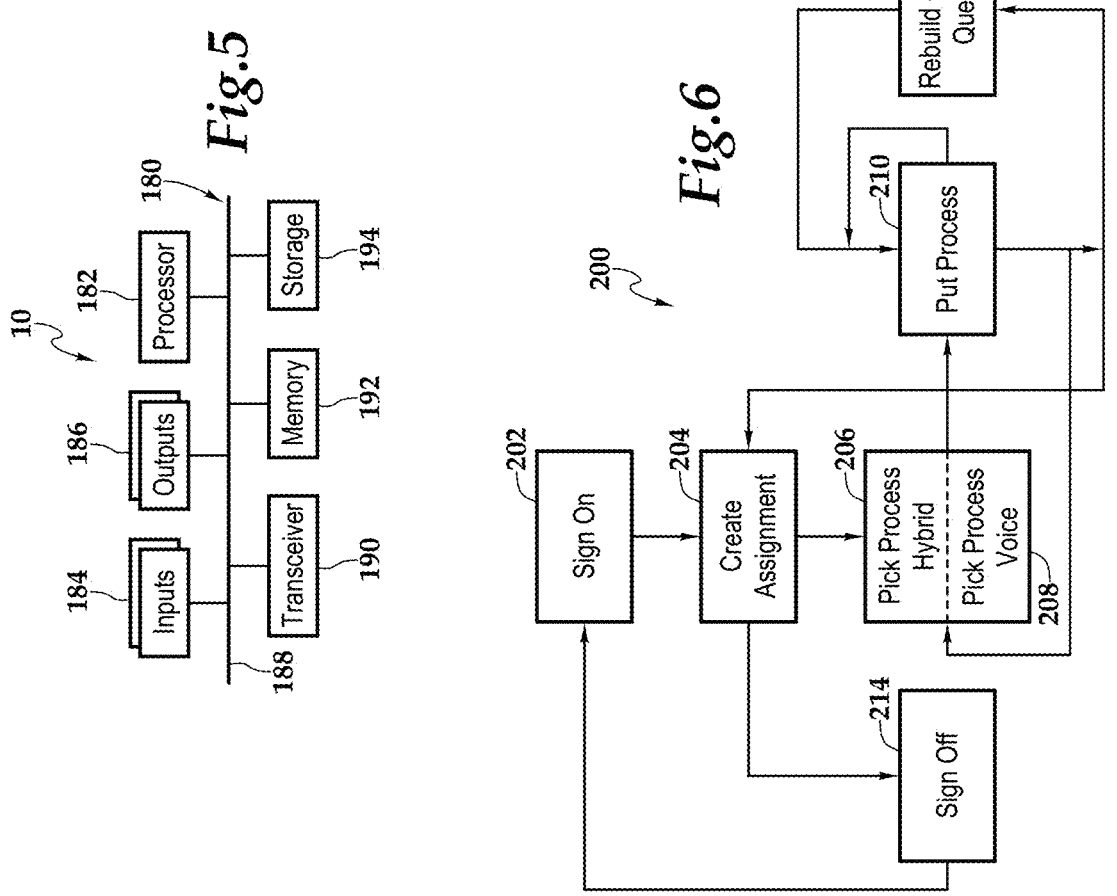

SYSTEM, METHOD, AND APPARATUS FOR PICKING-AND-PUTTING PRODUCT

PRIORITY STATEMENT & CROSS-REFERENCE TO RELATED APPLICATIONS

This application is a continuation of U.S. patent application Ser. No. 13/900,513, entitled "System, Method, and Apparatus for Picking-and-Putting Product," filed on May 22, 2013, in the name of Kevin H. Ambrose, and issued on Jul. 10, 2018 as U.S. Pat. No. 10,017,323; which claims priority from U.S. patent application Ser. No. 61/650,366, entitled "System, Method, and Apparatus for Picking-and-Putting Product" and filed on May 22, 2012 in the name of Kevin H. Ambrose; all of which are hereby incorporated by reference for all purposes.

TECHNICAL FIELD OF THE INVENTION

This invention relates, in general, to logistics and product fulfillment and, in particular, to systems—and related methods and apparatus—for the selective picking-and-putting of product, including individual items of merchandise, to fulfill orders within retail distribution systems, such as in a warehouse or distribution center environment, for example.

BACKGROUND OF THE INVENTION

By far the most pervasive product-handling process within any retailer's distribution system is the selective retrieval or "picking" of merchandise from inventory, whether cases or individual item units, to fill orders by "putting" product in containers, such as boxes or totes. In applications with higher volume and wider product assortment, "zone" picking is more typical, with each picker stationed in a designated area, or zone, and responsible for picking all ordered items in that area and placing them into containers (e.g., boxes or totes). Pickers in a typical pick-and-put process spend only a portion of the total work time actually picking and putting items in containers. A significant amount of time is spent traveling to the correct picking location, ensuring that the target pick is the right item, ensuring the right number of times have been picked, or just waiting to perform the next transaction.

A number of technologies, such as barcode scanning, pick-to-light, and pick-to-voice have been developed that improve accuracy and improve productivity of non-travel tasks. For example, in a pick-to-light system a picker, scans a carton, waits for lights to illuminate which product is to be picked, walks to the storage keeping unit (SKU) holding the product, selects the product, presses a button to turn off the light, places the product into the correct carton, and then scans the next carton. By way of further example, in a traditional pick-to-voice system, the picker works in a similar manner, but uses voice technology and audible indications to carry out the process instead of visual indications. A need exists for systems and methods that further improve accuracy and productivity.

SUMMARY OF THE INVENTION

It would be advantageous to achieve systems and methods for further improving accuracy and productivity when fulfilling orders in retail distribution systems. It would also be desirable to enable a computer-based solution that furnishes a tool for use on the distribution center floor for enabling ordering picking-and-putting so effectively that it may be used by an existing picking workforce for real-time or near real-time fulfillment. To better address one or more of these concerns, in one aspect of the invention, systems—and related methods and apparatus—are disclosed for the selective picking-and-putting of product, including individual items of merchandise, to fulfill orders within retail distribution systems, such as in a warehouse or distribution center environment, for example.

In one embodiment, the system includes hardware and software components to implement a pick-to-light and put-to-voice methodology, wherein a picker scans a number of cartons, which are the "slug" or "train," and a clip is attached to the first (or front) and end (or last) cartons of the slug such that the cartons are maintained in order from first to last. After a picker scans a number of cartons, the lights illuminate, sequentially or all at once, with all picks for the cartons. The voice components then indicate how many items from one particular Storage Keeping Unit (SKU) are put into each carton. For example, if the light indicates "15," then the voice may say "15" into "Carton Position 1;" or, if the product is to be distributed to multiple cartons, "2" into "Carton Position 2," "12" into "Carton Position 4," and "1" into "Carton Position 5." To validate all items were placed successfully, the picker or operator must scan verify each carton as items are placed. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 4 is a flow chart depicting one embodiment of a method for picking-and-putting product;

FIG. 5 is a schematic block diagram depicting one embodiment of an apparatus for picking-and-putting product according to the teachings presented herein;

FIG. 6 is a process flow diagram of one embodiment of an overall flow of different processes within the picking-and-putting teachings presented herein;

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Figure 1:
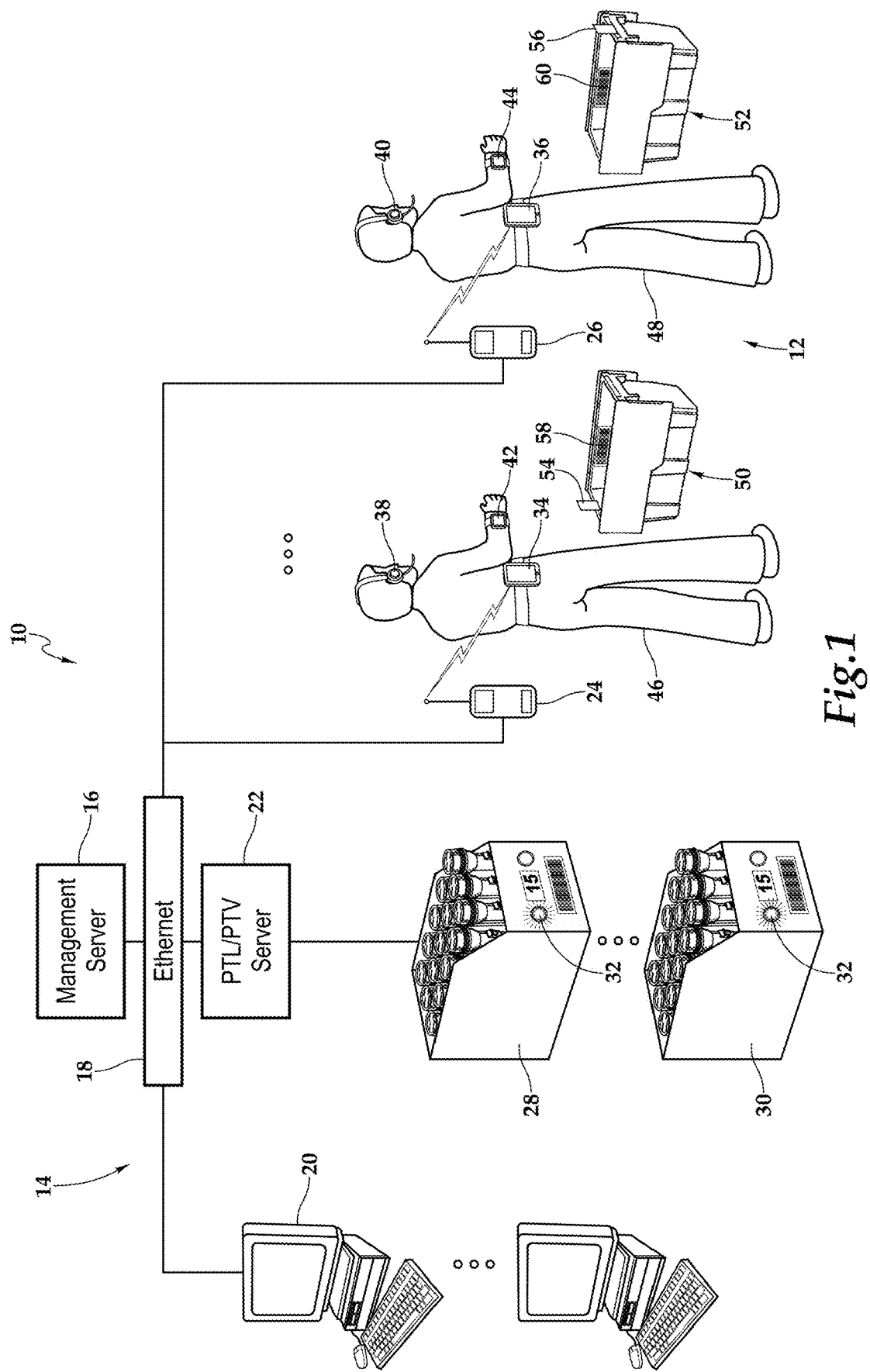
FIG. 1 is a schematic block diagram depicting one embodiment of a system for picking-and-putting product according to the teachings presented herein.

Referring initially to FIG. 1 therein is depicted a schematically-illustrated system, which is designated 10, for picking-and-putting product, including individual items of merchandise, to fulfill orders within a distribution system, such as in a warehouse or distribution center environment 12. In one embodiment, the system includes a control subsystem 14 having a management server 16 connected to multiple other computers and devices via a network connection 18, such as Ethernet. By way of example, located in communication with the network connection are various floor workstations 20, one or more pick-to-light (PTL)/put-to-voice (PTV) servers 22, and one or more wireless access points 24, 26 providing further connectivity to operators within the warehouse or distribution center environment. The system 10 described herein uses both visual and audible indications to leverage the speed of visual indications, which allow a user or operator to instantly identify the location and/or quantities of products to be picked, with the hands free ease of audible indications, which allow the user to interact with the system without holding a device in one or more hands. In this manner, the systems and methods presented herein provide pick-by-light and put-by-voice interaction.

The existing floor workstations 20 allow a manager to monitor the entire process. For example, the manager can see the productivity of the workers on the floor and determine if more or less workers or areas should be added to a particular picking zone, which is one or more areas that can each have one or more operators. The manager can also see when a Storage Keeping Unit (SKU), such as SKU 28 or SKU 30, within a picking bay at a location of an area in a picking zone is starting to run low on product and needs to be refilled or replaced.

As previously suggested, the one or more voice servers may be incorporated with the PTL/PTV server 22 or, alternatively, may be separate items connected in a different computer architecture. The PTL/PTV server 22 may in part be connected to and controls the lighting system 32 to enable pick-to-light functionality. The lighting system includes any form of lighting to identify in which SKUs products are to be picked from by the user of the system. The lighting system 32 may include one or more display units capable of displaying one or more numeric digits and having one or more buttons. The numeric digits allow for identification numbers and/or quantity numbers of products to be displayed and the buttons allow for adjustments of these numbers, if needed, and allow for other interaction with the system by the user.

The wireless access points 24, 26 allow for the connection of an RF unit 34, 36, a mobile voice device (MVD) 38, 40, and a scanner 42, 44, which may each be outfitted on an operator, such as operators 46, 48. The RF unit 34 contains all of the circuitry and software to connect the mobile voice device 38 and the scanner 42 wirelessly to the server 22. The mobile voice device 38, which may be a Talkman® MVD, contains all the circuitry and software to play audible indications from the server 22 to the operator 46 and to record and code audible indications from the operator 46 that are sent to the server 22. The scanner 42 may read various barcodes or other identifiers and transmit the information to the server.

The RF unit 34 and mobile voice device 38 may be worn by the user 46 to receive audible indications from the management server 16 via the PTL/VTP server 22. Data from the user is also sent from the RF unit 34 and mobile voice device 38 back to the server 22 via the wireless access point or points 24, 26. Data from the operator can include audible indications and barcode data if barcode scanner is included and connected to or incorporated within the RF unit 34 or mobile voice device 38 or scanner 42. The data that flows back and forth between server 16 and the operator 46 allows the software on the server to instruct the user on which products to pick and in which cartons to put the products. The flow of data, including the data flow from the scanner 42, which may be a wrist-worn scanner, also allows the server to verify that the right products were picked and placed into the right cartons, such as cartons 50, 52. The cartons 50, 52 may include clips 54, 56 to maintain the order of the cartons and scannable bar codes 58, 60 that identify the cartons 50, 52. It should be appreciated that although one particular computer architecture is depicted in FIG. 1, other computer architectures are within the teachings presented herein.

Figure 2:
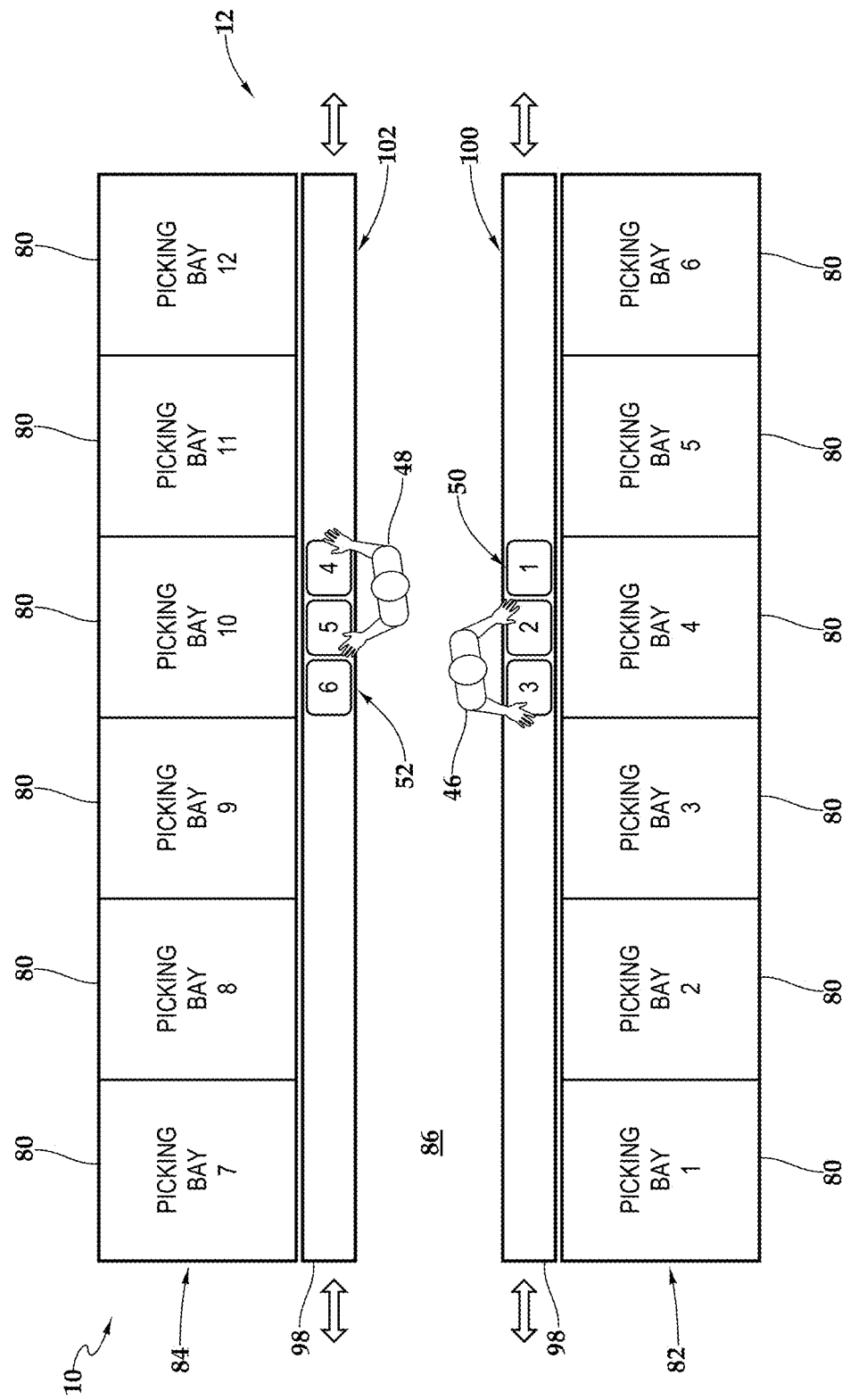
FIG. 2 is a top plan view of a plurality of picking zones implementing the system for picking-and-putting product presented in FIG. 1.
Figure 3:
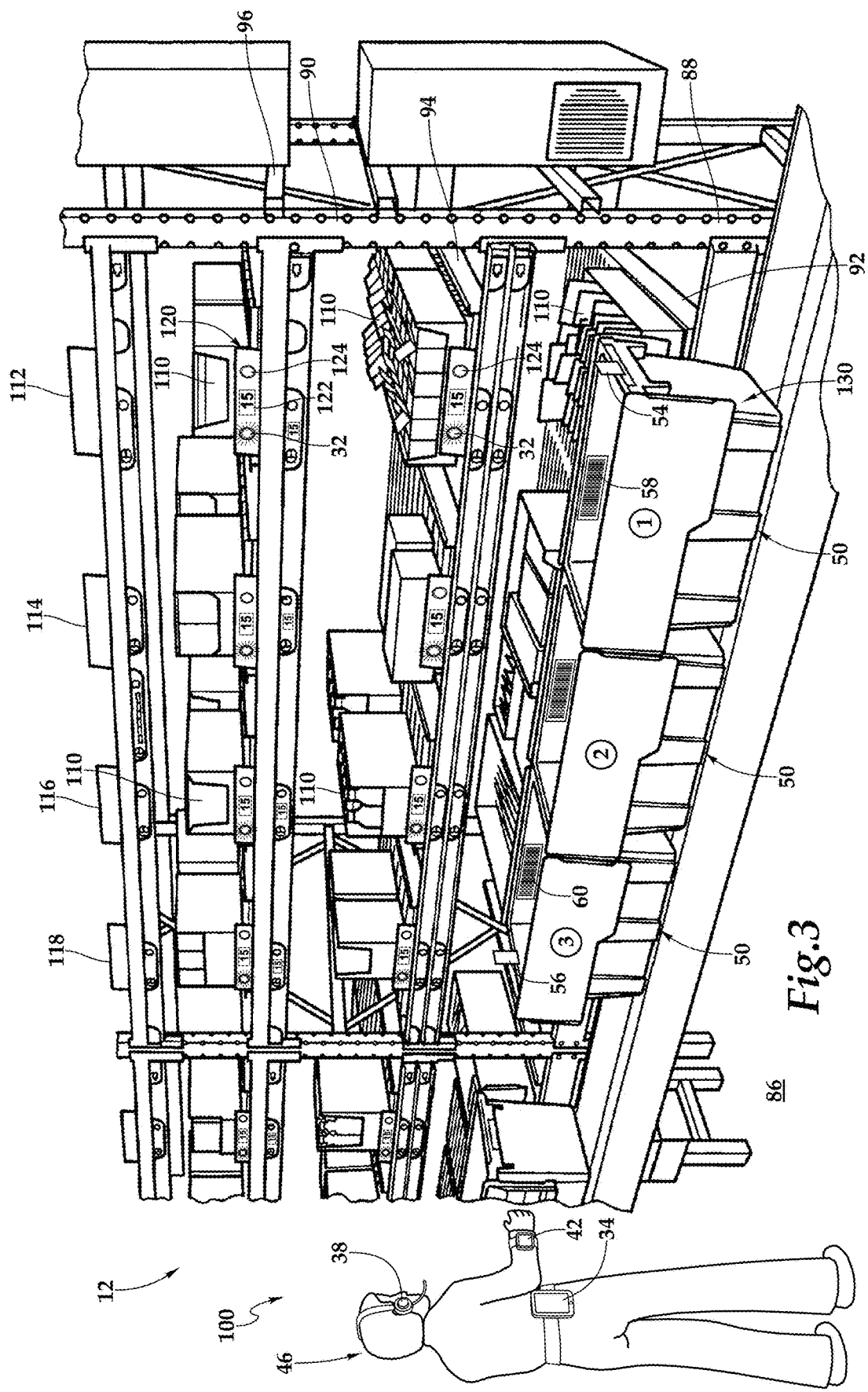
FIG. 3 is a front perspective view of picking bay presented in FIG. 2 as part of the plurality of picking zones.
Figure 7:
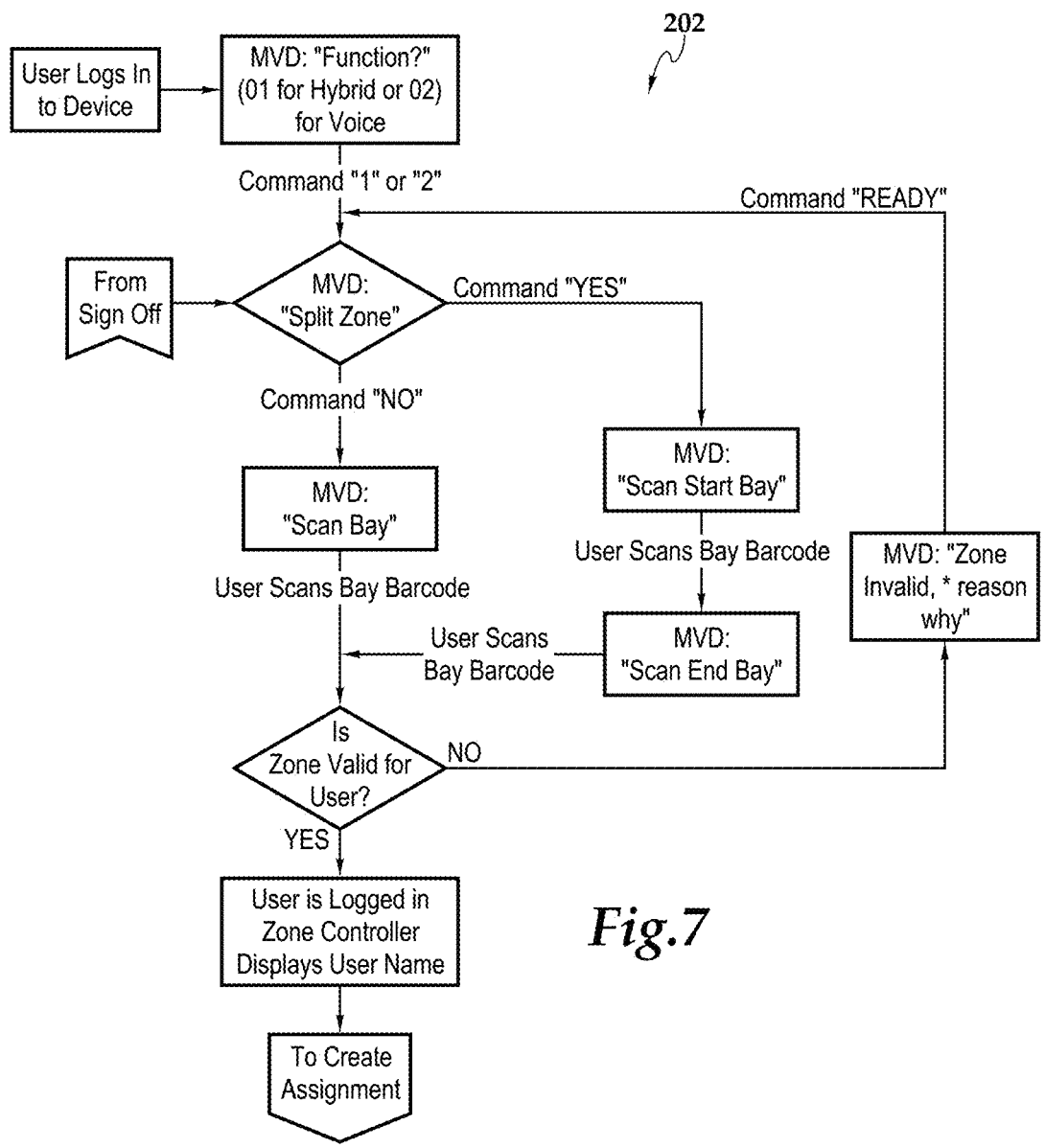
FIG. 7 is a process flow diagram of a "sign on" process, which forms a portion of the process flow presented in FIG. 6.
Figure 8:
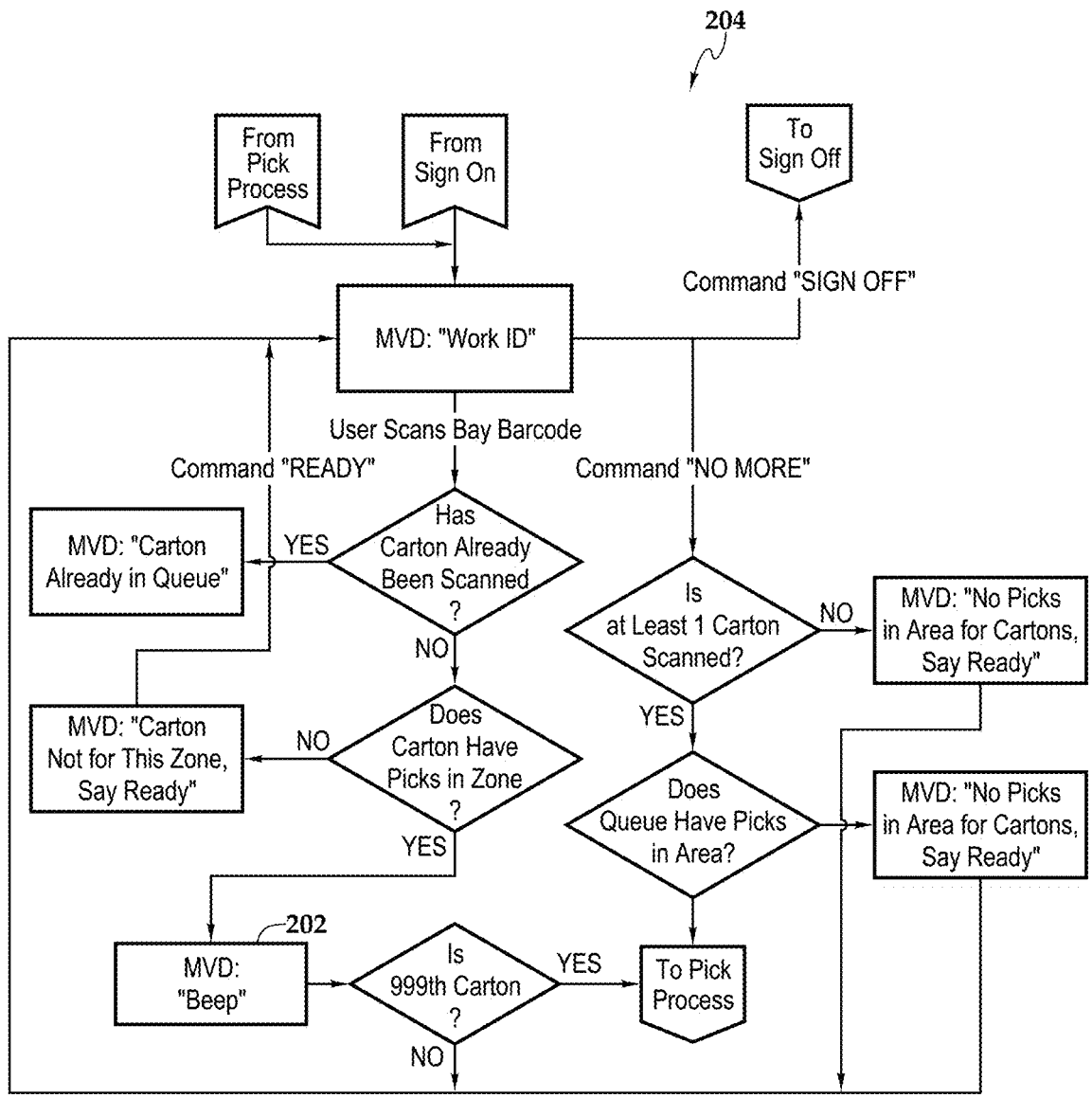
FIG. 8 is a process flow diagram of a "create assignment" process, which forms a portion of the process flow presented in FIG. 6.

Referring now to FIGS. 2-3, the system for picking-and-putting product 10 includes a plurality of picking bays 80 that are arranged in spaced apart rows 82, 84, which define therebetween a picking aisle 86. Though reference herein is made to one or two picking rows of picking bays and one aisle 86, it can be seen that any number of rows and aisles can be contemplated. The picking aisle 86 preferably provides sufficient open space for operators to move between the picking bays so that the operators 46, 48 are not limited to a specific zone or specific set of picking bays.

Each bay 80 includes a conventional case flow bay or rack 88 having a frame 90 and multiple vertically spaced shelves 92, 94, 96 that are supported by the frame 90 and may include rollers. Each shelf 92, 94, 96 may be canted or tilted so that product will flow to one side of the shelf. The lower side of the shelves are typically aligned along a discharge side of the bay, while the higher side of the shelves are aligned along an induct side of the bay. In addition, the system 10 may include belt conveyors 98—powered or unpowered—that are configured to accept totes or cartons 50, 52, which may be conventional plastic cartons having an identification 58, 60, such as an identification with a barcode that is readable by the system 10.

As best seen in FIG. 2, the picking bays are arranged to permit communication between the control subsystem 14 and the operators 46, 48 of the system 10 in a manner that permits an operator 46, 48 to increase his or her picking time so that the operators 46, 48 can work at his or her full capacity to thereby the throughput of the system. As shown, two operators 46, 48 are working in adjacent picking zones 100, 102. It should be appreciated, however, that any number of operators may be deployed in a parallel arrangement in any number of picking zones.

As best seen in FIG. 3, product 110 in each picking bay includes various products 110 that are arranged in the framed rows 112, 114, 116, 118 that extend across respective shelves 92, 94, 96 from the induct side to the discharge side of the bay. Each picking bay 80 includes a pick module 120 having at least one light 32 that is actuated by the control subsystem to designate that a product associated with the pick module 120 must be picked from that particular row of products and placed or put into a carton. Further, the pick module 120 may include a display 122 indicating the number of product associated with the pick module that must be removed for putting into a carton. Additionally, buttons 124 permit the operator to indicate when the order fulfillment for that particular product has been completed for that designated pick module or other functionality.

As illustrated, the operator 46 includes the RF unit 34, mobile voice device 38 (which may be considered an example of a wireless communication device), and the wrist-warn wireless scanner 42. In operation, within a logistics and product fulfillment environment, such as in a warehouse or distribution center environment, for example, the picking zone is established having picking bays 80 arranged in framed rows with each picking bay having pick module 120 associated therewith. Multiple cartons 50 are indexed into a carton train 130 and the operator is directed to pick-by-light and put-by-voice. More particularly, the operator 46 is directed to a pick by the light display 32 informing the operator which products 110 to pick. Within each pick, a voice indication via the mobile voice device 38 directs the operator 46 to one or more puts by directing the operator to select a number of product and corresponding carton from the picking bay associated with the pick. For example, if the light display 32 with the numerical counter or display 122 indicates "15," then the voice may say "15" into "Carton Position 1;" or, if the product is to be distributed to multiple cartons, into "Carton Position 2," "12" into "Carton Position 2," and "1" into "Carton Position 3." After a put is complete, a next light indicates a pick and the methodology continues in this manner.

FIG. 4 depicts one embodiment of a methodology for picking-and-putting product. At block 150, a picking zone is provided in a distribution environment. The picking zone includes a plurality of picking bays each having products arranged in framed rows and each product in each picking bay has a pick module associated therewith. Further, each pick module has a light display. At block 152, multiple cartons are indexed in an ordered position from a first carton to an nth carton to form a carton train. As previously discussed, each carton is configured to contain products.

At block 154, a picking sequence is initiated by placing the carton train in the picking zone. At block 156, each of the light displays is sequentially actuated to direct an operator to a pick by directing the operator to a specific picking bay, such that the light display informs the operator which products to pick. As previously discussed, each carton in the plurality of cartons in the carton train is associated with a product fulfillment such that the first carton has a first product fulfillment and the nth carton has an nth product fulfillment. This associated drives the picking and putting.

At block 158, within each pick, a voice indication is sequentially actuated to direct the operator to one or more puts by directing the operator to select a number of product and corresponding carton. At block 160, following each put, a verification scan is performed on the carton corresponding to the put. At decision block 162, if additional product in the pick requires a put, the process returns to block 158; otherwise, the process advances to decision block 164. At decision block 164 if additional product requires picking and positioning in the cartons, then the process returns to block 156; otherwise the process concludes at block 166.

FIG. 5 depicts an apparatus 180 for picking-and-putting product embodied on a computer. A processor 182 is coupled to one or more wireless transceivers 190 and inputs 184 and the outputs 186 by a bus 188. A memory 192 and storage 194 are accessible to the processor 182 and include processor-executable instructions that, when executed, cause the processor 182 to execute a series of operations.

The processor-executable instructions establish the pick-by-light and put-by-voice or hybrid pick-put system presented herein. In one embodiment, the processor-executable instructions specify receiving an initiation signal from the wireless transceiver that a picking sequence is to begin by placement of the carton train in the picking zone. The instructions may also specify associating each carton in the plurality of cartons in the carton train with a product fulfillment such that the first carton has a first product fulfillment and the nth carton has an nth product fulfillment.

Then, the instructions specify sequentially actuating each of the light displays to direct an operator to a pick by directing the operator to a specific picking bay, such that the light display informs the operator which products to pick relative to the product fulfillment associated with the carton train; and, within each pick, sequentially actuating a voice indication via the wireless communication device to direct the operator to one or more puts by directing the operator to select a number of product and corresponding carton. Following each put, the instructions may specify receiving a verification scan signal relative to the carton corresponding to the put.

FIG. 6 depicts one embodiment of an overall flow 200 of different processes within the picking-and-putting teachings, including the pick-to-light and put-to-voice technology presented herein. Flow modules include a sign-on module 202, a create assignment module 204, a pick process module (hybrid) 206, a pick process module (voice) 208, a put process module 210, a rebuild carton queue module 212, and a sign off module 214 inter-related as shown.

Referring now to FIGS. 7-13, an assignment associates all the products in a zone that needs to be picked for all of the cartons that have been queued by the worker or user. The process of creating an assignment creates a group of cartons, which may also be referred to as a slug or a train. After signing on, the system indicates that it is ready for the user to add another carton to the queue and indicates that it wants a work identification (number) for the next carton by giving an audible indication, such as by stating "Work ID" via the user's mobile voice device. In response, the user can: scan a carton; state "No More"; or state "Sign off."

Scanning a carton adds the carton to the queue and adds the carton to the assignment. In adding the carton to the assignment, the management server associates to the assignment the products that need to be picked from the zone and put into the carton. If the carton has already been scanned in, then the mobile voice device may state "Carton already in queue" and then request another work identification. If the carton does not have any picks in the zone, then the mobile voice device may state "Carton not for this Zone, say ready" to inform the user that no product will be put into this carton of the queue and to request an indication from the user of when the user is ready to proceed.

If the carton has not already been scanned and the carton does have picks in the zone, then the mobile voice device may give an audible beep to indicate that the carton has been added to the assignment. If this carton is less than or equal to the 999th carton of the queue, then the mobile voice device may state "Work ID" to prompt the user to scan another carton and add it to the assignment. The threshold of 999 is an arbitrary number that can be adjusted to any number as desired by the manager and/or the user.

Stating "No More," in response to a request for a work identification, indicates that the user does not wish to add any more cartons to the current queue and assignment. If there is not at least one carton in the assignments and queue, then the server requests another work identification. If the queue of cartons does not have any picks in the area, then the mobile voice device may state "No picks in area for cartons, say ready" to indicate that the user should pass all the cartons in the queue on to the next area and say "ready" after doing so.

Stating "Sign Off" indicates that the user wishes to sign off from the system. The user is not allowed to sign off or log off if there are still picks in the user's zone. As a part of creating the assignment, one or more clips may be placed onto cartons of the queue. A clip might be placed on every carton of the queue, onto the first and last cartons of the queue, onto the first and then every fifth carton of the queue, or any other arrangement. These clips include a display and the clips are a part of the lighting system, which provides visual indications to the user. When products are to be put into the cartons, the display and/or lights on the clips indicate to the user which cartons the product should be placed. The visual indication may include a display of the number, rank, or order of the carton in the queue onto which the clip is place. The visual indication may also display the quantity of product that is to be placed into the carton during the put process. The clips may include an LCD display, an LED display, one or more LEDs to make a display, and the like.

Figure 9:
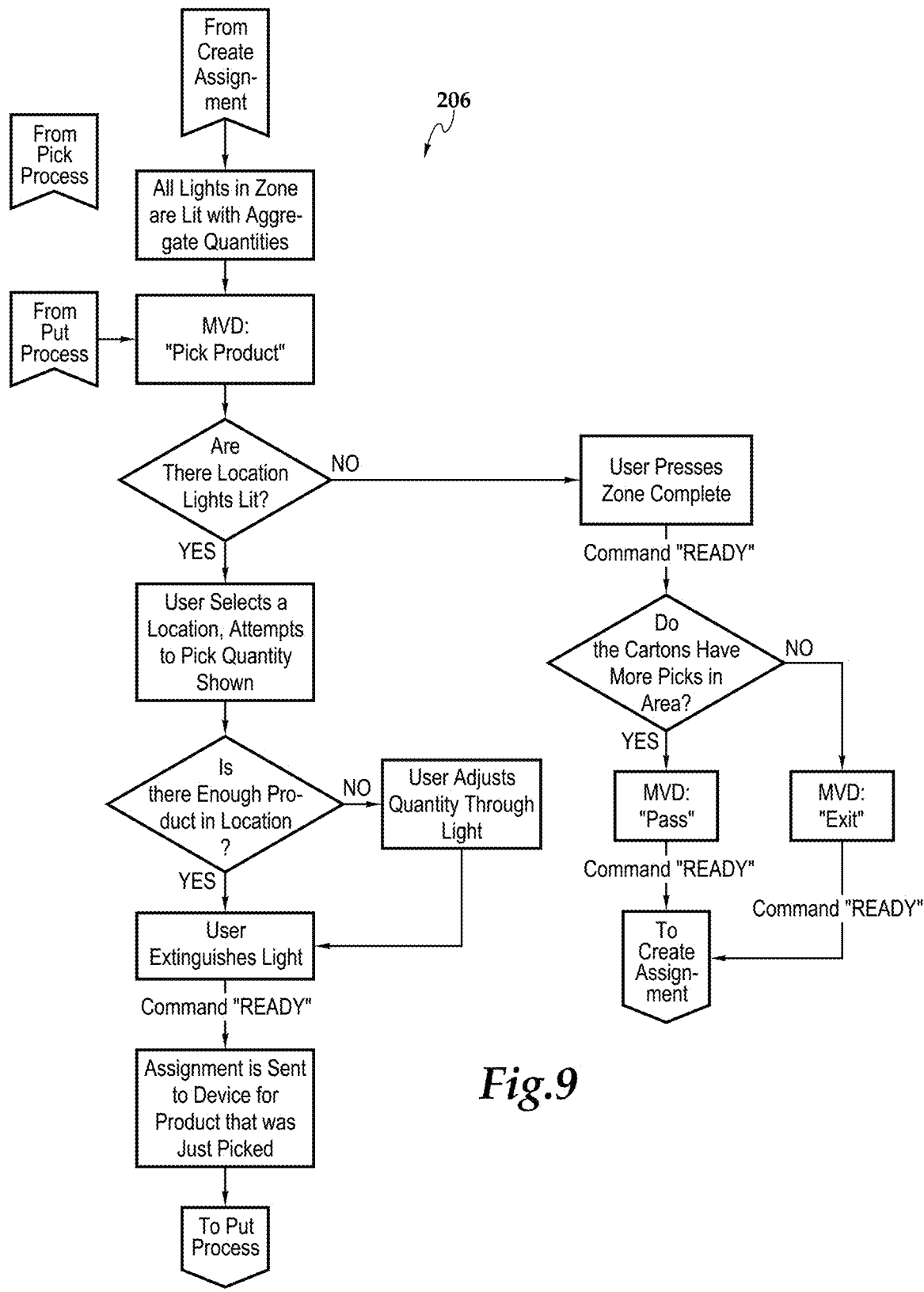
FIG. 9 is a process flow diagram of a "pick process-hybrid" process, which forms a portion of the process flow presented in FIG. 6.
Figure 10:
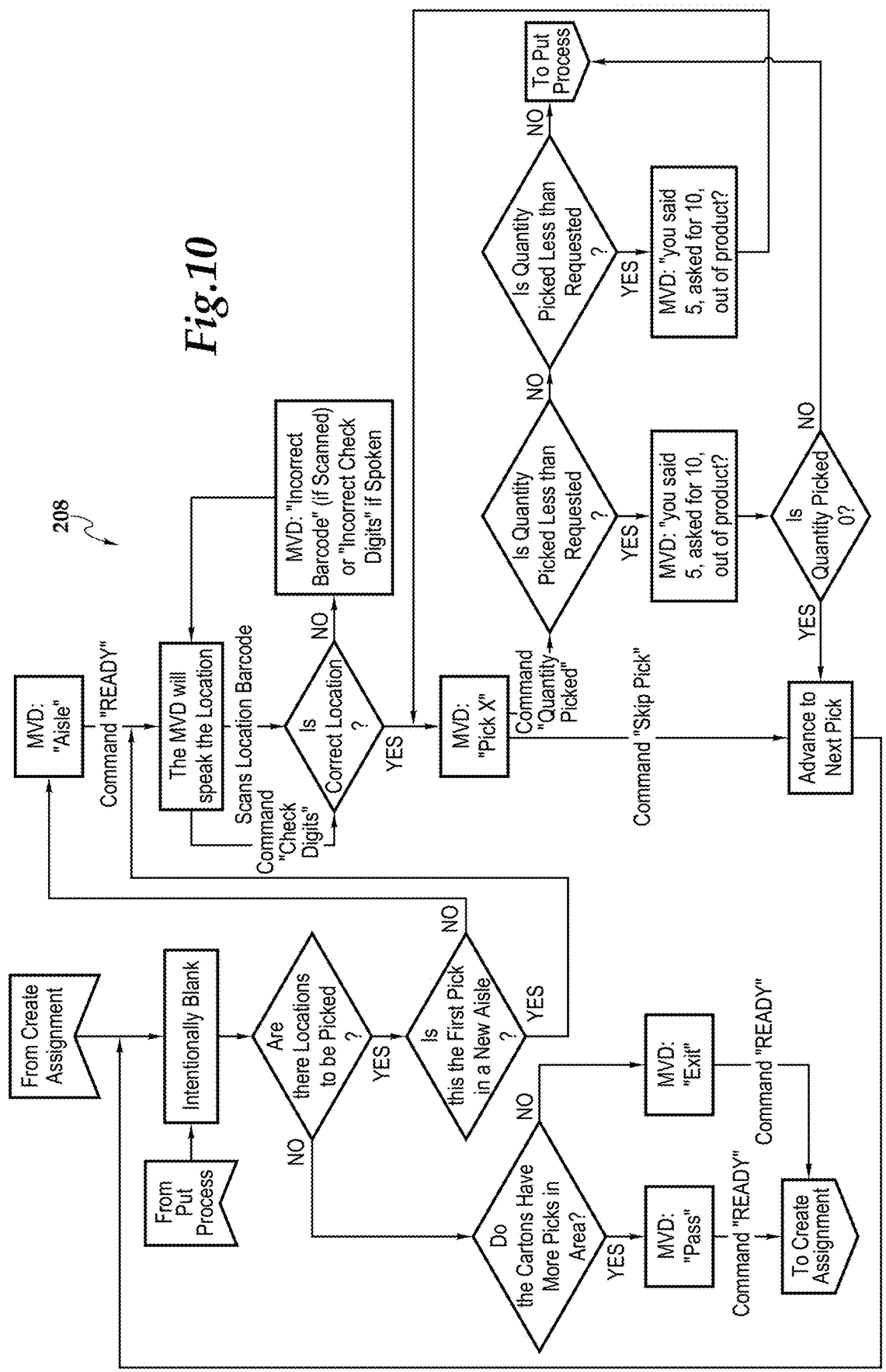
FIG. 10 is a process flow diagram of a "pick process—voice only" process, which forms a portion of the process flow presented in FIG. 6.

As best presented in FIG. 9, after an assignment has been created, all the lights in a zone are lit with the aggregate number of quantities needed to fulfill all of the cartons in the queue. Using visual indicators, such as a lighting system, allows the user to instantly identify which products stored in the SKUs of the zone need to be picked. Additionally, displaying the aggregate number of products from each SKU allows the user to instantly know how much product to pick from an SKU.

The mobile voice device indicates to the user that the products should be picked by stating "Pick Product" to the user. This audible indication enhances the visual indication by giving a clear signal to the user that all of the appropriate lights, if any, have been lit to indicate all of the SKUs and aggregate quantities associated with the products needed for the cartons of the queue.

But an area is a subset of a zone, as such, while there may be product to pick in the zone, there may not be any products to pick in this particular area. In this case, the user would see that no lights are lit and then press a complete button and/or give an audible indication of such to the system, such as by stating "Ready." If the cartons of the queue have more products to pick in the zone, then the mobile voice device may state "Pass" to indicate to the user that the cartons should be passed along to the next area; the server would end the current assignment, and go back to start the creation of a new assignment. If the cartons of the queue have no more products to pick in the zone, then the mobile voice device may state "Exit" to indicate to the user that the cartons should be passed along to the next zone; the server would end the current assignment, and go back to start the creation of a new assignment.

When at least one in visual indication indicates that there are products to pick in the user's area of a zone, the user selects which location and SKU from which to pick. If there's not enough product at a location in the SKU, the user can adjust the quantity via the visual indication system with one or more buttons associated with the light at the location. The user may press a button one or more times to reduce the number displayed to the actual number of items that the user has picked.

After picking the product, the user extinguishes the light at this location by pushing a button. The user then states "ready", to indicate a readiness to put the product into the appropriate cartons of the queue. The pick process may also be performed with a voice only system. In such a system, all of the interaction between the management server and the user is handled via audible indications.

Figure 11:
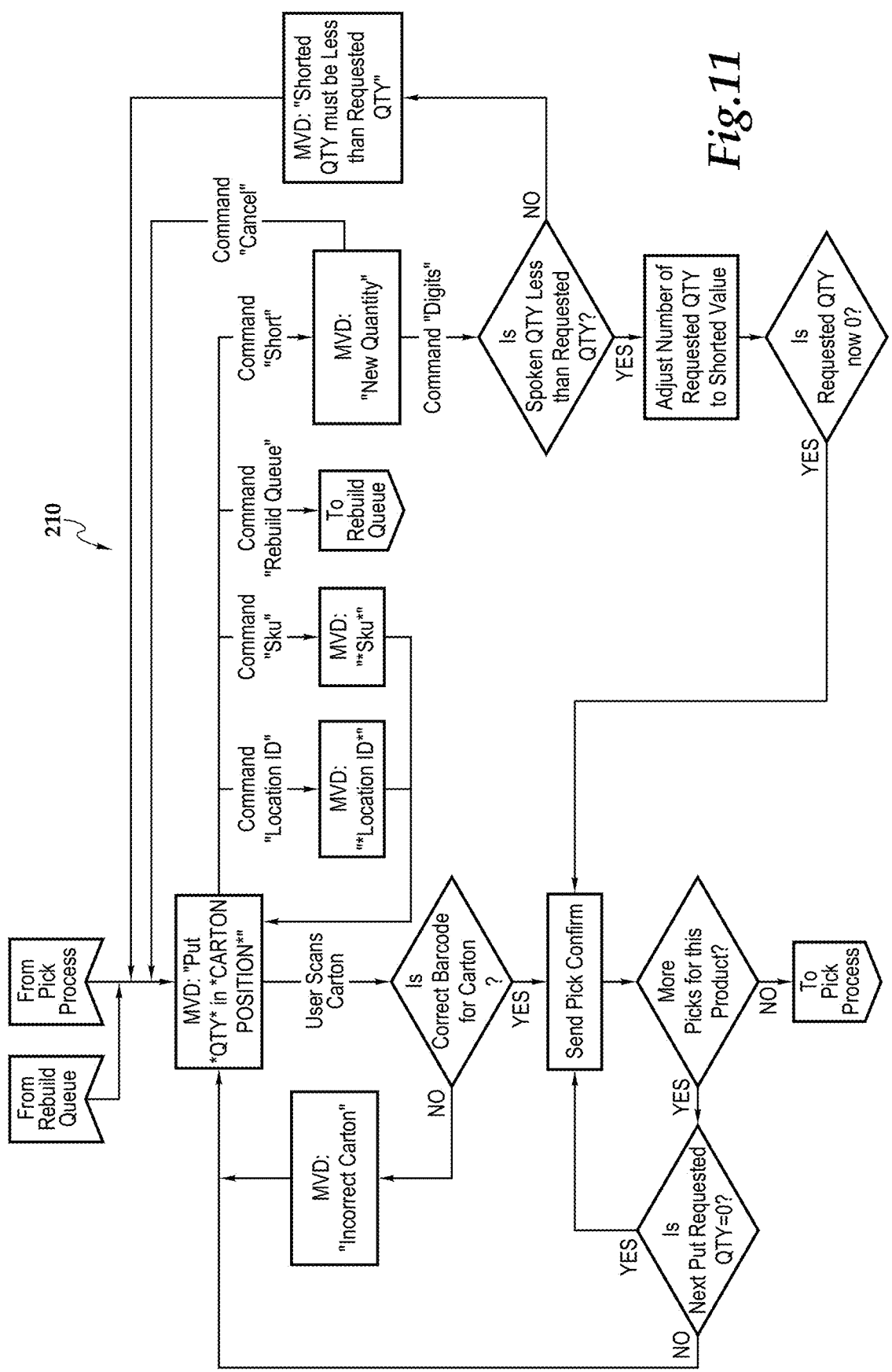
FIG. 11 is a process flow diagram of a "put" process, which forms a portion of the process flow presented in FIG. 6.
Figure 12:
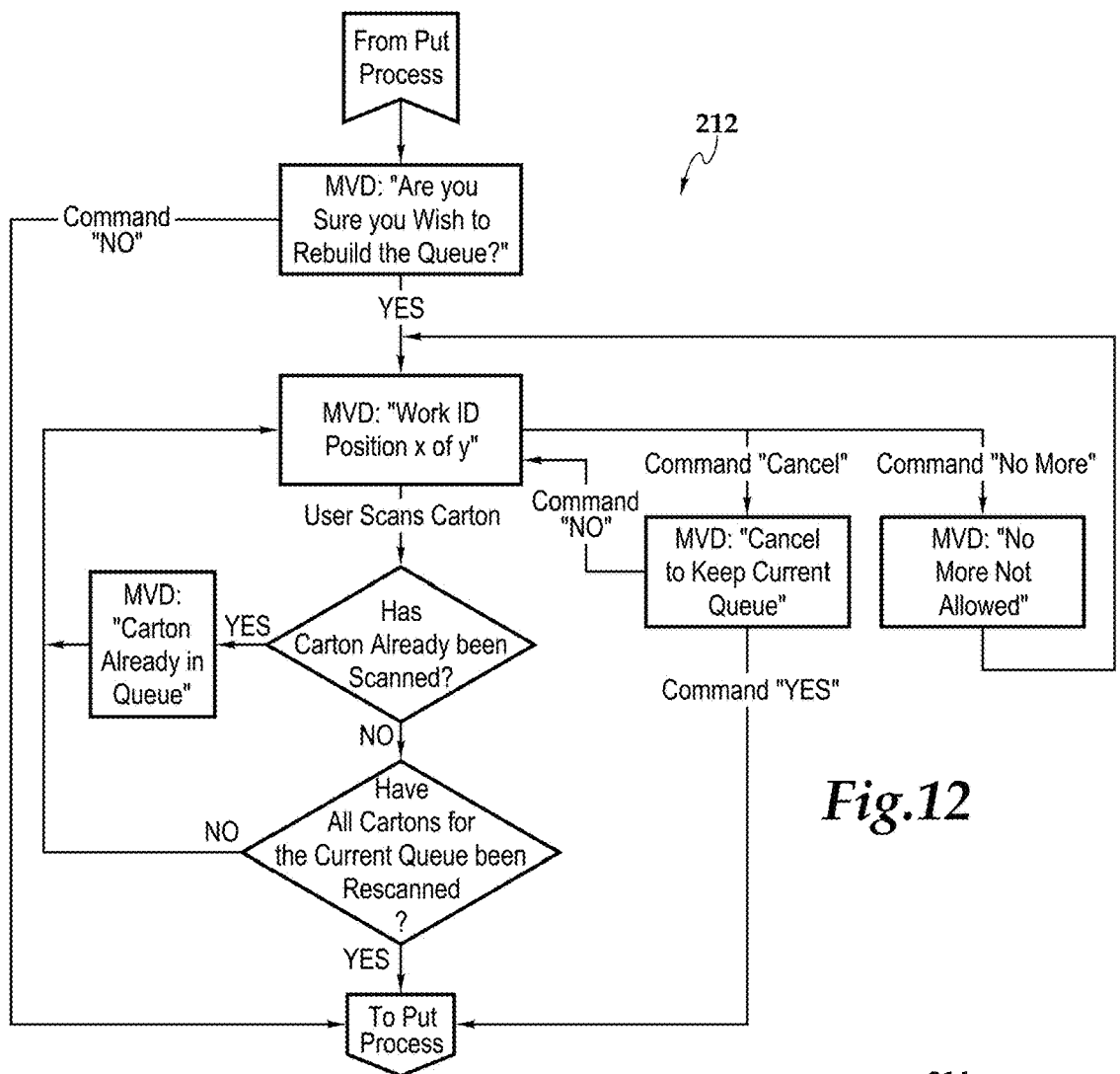
FIG. 12 is a process flow diagram of a "rebuild carton queue" process, which forms a portion of the process flow presented in FIG. 6.
Figure 13:
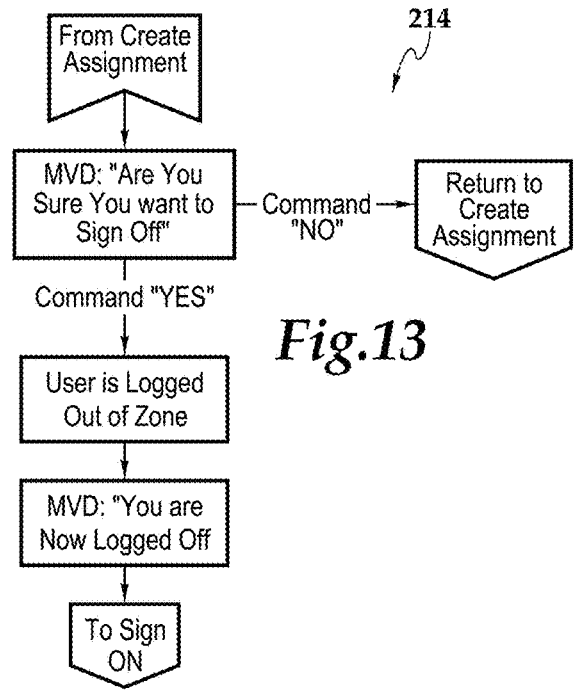
FIG. 13 is a process flow diagram of a "sign off" process, which forms a portion of the process flow presented in FIG. 6.

As best noted in FIG. 11, the mobile voice device gives a put command by stating "Put *QTY* in *CARTON POSITION*" to indicate to the user the quantity of product to be put into which carton of the queue. For example, the mobile voice device may state "Put 5 into Carton Position 07" to put five pieces of a product into a carton at the seventh position of the queue.

If the user scans a barcode in response to the put command, this indicates that the user placed the quantity of items of the product into the carton that was scanned. The system double checks the barcode of the carton to ensure that it is the proper barcode. If the wrong carton was scanned, mobile voice device may state "incorrect carton" to indicate to the user that the product was placed into the wrong carton. The system may then repeat the original put command to identify the specified quantity of product and the specified carton.

If the correct barcode was scanned, the system sends a pick confirmation to update the status of the assignment. If there are more puts for the current product, then the system determines if the quantity of the next put is less than or equal to zero. If the quantity of the next put is not less than or equal to zero, then the put process repeats, i.e., the mobile voice device again specifies a quantity and carton position for the user to put some or all of the remaining product that was picked. If the quantity of the next put is less than or equal to zero, then the process sends another pick confirmation to close out this product from the assignment and restarts the pick process, i.e., by stating "Pick Product" to prompt the user to pick items of a product.

If the user states "Location ID," then the mobile voice device may state the location ID that is associated with any of the product, the carton, the queue, the zone, the area, and the assignment. The put process then repeats by the mobile voice device specifying a quantity and carton position for the user to put some or all of the remaining product that was picked.

If the user states "SKU," then the mobile voice device may state the SKU that is associated with any of the product. The put process then repeats by the mobile voice device specifying a quantity and carton position for the user to put some or all of the remaining product that was picked.

If the user states "Rebuild Queue," then the system starts the rebuild queue process to rebuild the entire queue that the user has been working with. The rebuild to process will require the user to rescan the barcodes of all of the cartons of the queue and reconfirm all the picks that have already been done for the cartons of the queue and the products of the zone associated with the assignment. This allows the user to verify the correctness of all of the product that has been placed into the cartons of the queue.

If the user states "Short," then this indicates that there is not enough product to satisfy the quantity specified in the put command given at the beginning of the put a process. The system requests the new quantity of the product via the mobile voice device stating "New quantity?" If the users state "Cancel," then this indicates to the system that it does not need to adjust the quantity of the product, and the system restarts the put process. Otherwise, the user gives an indication of the quantity that was placed into the carton. This indication may be given by speaking the digits of the number of items of the product that was placed into the carton. For example, when twelve (12) items are placed into a carton, the user may speak "one, two" to indicate that twelve (12) items were placed into the carton.

The system determines if the spoken quantity is less than the quantity specified in the put command. If the spoken quantity is not less than the request quantity, as specified in the put command, then the system notifies the user and restarts the put process. This notification may be by the mobile voice device stating "Shorted QTY must be less than requested QTY." If the spoken quantity is less than the requested quantity, then the system adjusts the number of the requested quantity to the shorted value and updates the assignment.

After adjusting the number of the requested quantity, the system then determines if the requested quantity is now zero. If the requested quantity is now zero, then the system sends a pick confirmation. Since the requested quantity is now zero, no more items of the product can be put into the cartons of the queue. As such, the process will then close out this product from the assignment and go back to the pick process. If the requested quantity is not now zero, then the system restarts the process to put more of the current product into the appropriate cartons of the queue.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A method for picking-and-putting products, the method comprising:
   providing an aisle including adjacent picking zones in a distribution environment, each adjacent picking zone including a row of picking bays, each picking bay having a plurality of pick modules, each pick module having a product associated therewith, each pick module having a light;
   providing a control subsystem in communication with an operator and each of the pick modules;
   indexing a plurality of cartons in an ordered position from a first carton to an nth carton to form a carton train;
   registering the carton train with the control subsystem such that the ordered position is registered with the control subsystem;
   positioning the carton train in one of the picking zones in the ordered position registered with the control subsystem;
   associating each carton in the plurality of cartons in the carton train with a product fulfillment such that the first carton has a first product fulfillment and the nth carton has an nth product fulfillment;
   on a picking zone-by-picking zone basis, sequentially actuating each of the lights to designate that a product associated with a pick module must be put into at least one of the plurality of cartons, thereby illuminating all picks corresponding to the plurality of cartons in the picking zone; and
   within each picking zone, on a pick module-by-pick module basis, as each pick becomes a put, providing the operator a voice indication including a quantity of product, the voice indication including the corresponding ordered carton position in the carton train based on the ordered position registered with the control subsystem, thereby permitting the operator to put a particular product from a particular pick module in more than one carton during a single operator pick at the particular pick module.

2. The method as recited in claim 1, further comprising enabling a plurality of operators to individually pick-and-put in parallel on the adjacent picking zones.

3. The method as recited in claim 1, further comprising providing each pick module with an individual numeric display with a light, an acknowledgement button, and a digital readout for indicating quantity.

4. The method as recited in claim 1, further comprising providing the operator with a wireless mobile voice device configured to receive voice indications and a wireless scanner configured to perform a verification scan.

5. The method as recited in claim 1, further comprising providing each carton with a readable identification number.

6. A method for picking-an-putting products, the method comprising:
   providing an aisle including adjacent picking zones in a distribution environment, each adjacent picking zone including a row of picking bays, each picking bay having a plurality of pick modules, each pick module having a product associated therewith, each pick module having a light display;
   indexing a plurality of cartons in an ordered position from a first carton to an nth carton to form a carton train, each carton being configured to contain products;
   initiating a picking sequence by placing the carton train in one of the picking zones in the ordered position;
   on a picking zone-by-picking zone basis, sequentially actuating each of the light displays to direct an operator to a pick by directing the operator to a specific picking bay, such that the light display informs the operator which products to pick; and
   within each picking zone, on a pick module-by-pick module basis, within each pick, sequentially actuating a voice indication to direct the operator to one or more puts by directing the operator to select a number of product, the voice indication indicating the corresponding carton by indicating the ordered position.

7. The method as recited in claim 6, further comprising enabling a plurality of operators to individually pick-and-put in parallel on the adjacent picking zones.

8. The method as recited in claim 6, further comprising providing each pick module with an individual numeric display with a light, an acknowledgement button, and a digital readout for indicating quantity.

9. The method as recited in claim 6, further comprising providing the operator with a wireless mobile voice device configured to receive voice indications and a wireless scanner configured to perform the verification scan.

10. The method as recited in claim 6, further comprising providing each carton with a readable identification number.

11. A system for picking-and-putting product, the system comprising:
- a control subsystem configured in communication with an aisle having adjacent picking zones in a distribution environment, each adjacent picking zone including a row of picking bays, each picking bay having a plurality of pick modules, each pick module having a product associated therewith, each pick module having a light display;
- the control subsystem configured to accept an indexing via a wireless signal that a plurality of cartons are positioned in an ordered position from a first carton to an nth carton to form a carton train, each carton being configured to contain products;
- a wireless communication device located in communication with the control subsystem, the wireless communication device being configured to be assigned to an operator;
- a wireless scanner located in communication with the control subsystem, the wireless scanner being configured to be assigned to the operator;
- a processor disposed in the control subsystem; and
- a memory accessible to the processor, the memory including processor-executable instructions that, when executed cause the processor to:
  - receive an initiation signal that a picking sequence is to begin by placement of the carton train in one of the adjacent picking zones,
  - on a picking zone-by-picking zone basis, sequentially actuate each of the light displays to direct an operator to a pick by directing the operator to a specific picking bay, such that the light display informs the operator which products to pick, and
  - on a pick module-by-pick module basis, within each pick, sequentially actuate a voice indication via the wireless communication device to direct the operator to one or more puts by directing the operator to select a number of product, the voice indication indicating the corresponding carton and the ordered position of the corresponding carton based on the carton train.

12. The system as recited in claim 11, wherein the control subsystem is configured to handle a plurality of operators to individually pick-and-put in parallel on the adjacent picking zones.

13. The system as recited in claim 11, wherein each pick module further comprises an individual numeric display with a light, an acknowledgement button, and a digital readout for indicating quantity.

14. The system as recited in claim 11, wherein the wireless communication device further comprises a wireless mobile voice device configured to receive voice indications.

15. The system as recited in claim 11, wherein each carton further comprises a readable identification number.

16. A system for picking-and-putting products, the system comprising:
- a control subsystem configured in communication with an aisle having adjacent picking zones in a distribution environment, each adjacent picking zone including a row of picking bays, each picking bay having a plurality of pick modules, each pick module having a product associated therewith, each pick module having a light display;
- the control subsystem including a wireless transceiver;
- the control subsystem configured to accept an indexing via a wireless signal that a plurality of cartons are positioned in an ordered position from a first carton to an nth carton to form a carton train, each carton being configured to contain products;
- a wireless communication device located in communication with the control subsystem, the wireless communication device being configured to be assigned to an operator;
- a wireless scanner located in communication with the control subsystem, the wireless scanner being configured to be assigned to the operator;
- a processor disposed in the control subsystem; and
- a memory accessible to the processor, the memory including processor-executable instructions that, when executed cause the processor to:
  - receive an initiation signal from the wireless transceiver that a picking sequence is to begin by placement of the carton train in one of the adjacent picking zones,
  - associate each carton in the plurality of cartons in the carton train with a product fulfillment such that the first carton has a first product fulfillment and the nth carton has an nth product fulfillment,
  - on a picking zone-by-picking zone basis, sequentially actuate each of the light displays to direct an operator to a pick by directing the operator to a specific picking bay, such that the light display informs the operator which products to pick relative to the product fulfillment associated with the carton train, and
  - on a pick module-by-pick module basis, within each pick, sequentially actuate a voice indication via the wireless communication device to direct the operator to one or more puts by directing the operator to select a number of product, the voice indication indicating the corresponding carton and the ordered position of the corresponding carton based on the carton train.

17. The system as recited in claim 16, wherein the control subsystem is configured to handle a plurality of operators to individually pick-and-put in parallel on the adjacent picking zones.

18. The system as recited in claim 16, wherein each pick module further comprises an individual numeric display with a light, an acknowledgement button, and a digital readout for indicating quantity.

19. The system as recited in claim 16, wherein the wireless communication device further comprises a wireless mobile voice device configured to receive voice indications.

20. The system as recited in claim 16, wherein each carton further comprises a readable identification number.

* * * * *